(12) United States Patent
Shinkai et al.

(10) Patent No.: US 8,033,534 B2
(45) Date of Patent: Oct. 11, 2011

(54) JIG AND METHOD FOR PROCESSING CYLINDER BLOCK

(75) Inventors: Tomoyuki Shinkai, Aichi (JP);
Takahiro Harada, Chiryu (JP);
Kazuhiro Asayama, Nagoya (JP);
Kazuki Watanabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 425 days.

(21) Appl. No.: 12/443,610

(22) PCT Filed: Oct. 3, 2007

(86) PCT No.: PCT/JP2007/069794
§ 371 (c)(1),
(2), (4) Date: Mar. 30, 2009

(87) PCT Pub. No.: WO2008/044719
PCT Pub. Date: Apr. 17, 2008

(65) Prior Publication Data
US 2010/0072687 A1    Mar. 25, 2010

(30) Foreign Application Priority Data
Oct. 6, 2006    (JP) .................................. 2006-275458

(51) Int. Cl.
*B23B 41/12*    (2006.01)
*B24B 33/10*    (2006.01)

(52) U.S. Cl. .......................................................... 269/40
(58) Field of Classification Search .................... 269/40; 408/1 R
See application file for complete search history.

(56) References Cited

U.S. PATENT DOCUMENTS
5,804,043 A * 9/1998 Ikegaya ...................... 204/224 R

FOREIGN PATENT DOCUMENTS

| | | |
|---|---|---|
| JP | 56-134169 A | 10/1981 |
| JP | 59-7448 A | 1/1984 |
| JP | 62-287965 A | 12/1987 |
| JP | 2004-243514 A | 9/1994 |
| JP | 2000-52228 A | 2/2000 |
| JP | 2004-36511 A | 2/2004 |
| JP | 2005-199378 A | 7/2005 |

* cited by examiner

*Primary Examiner* — David B Thomas
(74) *Attorney, Agent, or Firm* — Kenyon & Kenyon LLP (57) ABSTRACT

In a dummy head (a jig for processing a cylinder block) having a dummy head body deforming a cylinder bore by assembling into a mounting surface of the cylinder block by bolt fastening, during the finish processing of the cylinder bore, a boss having a contact surface contacting a peripheral portion of the cylinder bore on the head mounting surface is provided on a mounting surface side for the cylinder block of the dummy head body, and at least the dummy head body has a higher rigidity than the cylinder block.

6 Claims, 5 Drawing Sheets

JIG AND METHOD FOR PROCESSING CYLINDER BLOCK

This is a 371 national phase application of PCT/JP2007/069794 filed 3 Oct. 2007, claiming priority to Japanese Patent Application No. 2006-275458 filed 6 Oct. 2006, the contents of which are incorporated herein by reference.

BACKGROUND OF THE INVENTION

1. Field of the Invention

The present invention relates to a jig (so-called a dummy head) for processing a cylinder block for use in finish processing of a cylinder bore in the cylinder block and a method for processing the cylinder block.

2. Related Art

Conventionally, in finish processing of a cylinder bore in a cylinder block, so-called a dummy head, is used as a jig for processing the cylinder block. Specifically, it is used as follows.

In other words, the finish processing such as a honing process is performed so as to provide a predetermined roundness for the cylinder bore in the cylinder block. After the finish processing for the cylinder bore, the cylinder head is assembled into the cylinder block. In the assembly of the cylinder head into the cylinder block, fastening means such as a bolt (a head bolt) is used. In fact, the head bolt penetrates into the cylinder head and is threaded into a bolt hole provided on the cylinder block, so that the cylinder head is fastened and fixed into the cylinder block. The tightening force (the fastening force) acting on the cylinder block by the head bolt causes the cylinder block a deformation, thereby leading to the deformation of the cylinder bore (the bore deformation), i.e., lowering the roundness of the cylinder bore.

Therefore, in the finish processing for the cylinder bore, the same tightening force equivalent to that acting when the cylinder head assembled is acted on the cylinder block, so that the dummy head having a through-bore admitting the finish processing for the cylinder bore is used as the jig for processing.

More specifically, the dummy head as the jig for processing different from the cylinder head assembled as an actual finished product is assembled into the cylinder block similarly to the cylinder head by the fastening means such as the bolt (for example, the head bolt), whereby the cylinder block is in the state similar to the one the cylinder head is assembled. The finish processing for the cylinder bore is performed, in such a state of the cylinder block.

Accordingly, the finish processing for the cylinder bore is performed, in the state where the prescribed tightening force is added to the cylinder block, i.e., in the state where the deformation by the tightening force is added to the cylinder bore, and the cylinder head is assembled into the cylinder block after the finish processing. Consequently, the bore deformation, which is caused by the tightening force during the assembly of the cylinder head, is prevented.

With regard to the finish processing for the cylinder bore in the cylinder block using the above-mentioned dummy head, for example, the following technology is disclosed.

JP2004-243514-A discloses the construction, which the corresponding portion to the periphery of the cylinder bore in the cylinder block, in the dummy head, is provided with a bead portion projecting toward the cylinder block, and a recessed portion is provided on the periphery side of the bead portion. In the above-described construction, when the dummy head is attached to the cylinder block by bolt fastening, the dummy head elastically deforms by the action of the bead portion and the recessed portion, thereby absorbing the force caused during the assembly. Accordingly, the deformation of the cylinder bore can be easily obtained without a gasket or the like, thereby performing the finish processing for the cylinder bore at low cost and with a high degree of accuracy. The foregoing construction is described in the above-mentioned patent publication.

In JP2000-52228-A, the shapes of a shim integrally attached on the matching surface of the cylinder block of the dummy head are structurally engineered or the like. Due to these structurally engineered shapes of the shim or the like, the deformation caused by the assembly of the dummy head into the cylinder block is in much the same state as that caused by the assembly of the cylinder head into the cylinder block, thereby trying to improve the accuracy of the cylinder bore during the assembly of the cylinder head.

Meanwhile, regarding the bore deformation in the cylinder block, in addition to the deformation caused by the tightening force accompanying the assembly of the cylinder head as described above, there is a deformation caused by the heat load (the heat stress) such as heat expansion, heat strain at the time of actual working of the engine including the cylinder block. In other words, the bore deformation at the time of actual working of the engine includes that caused at the time of assembling the cylinder head (hereinafter, referred to as "assembly deformation") and that caused by the heat load at the time of actual working of the engine (hereinafter, referred to as "heat deformation".

However, both of the technologies disclosed in the two patent publications relate to the constructing technique for improving the roundness of the cylinder bore at the time of the "assembly" of the cylinder head into the cylinder block via the gasket, i.e., the technology focused on only the assembly deformation out of the bore deformations, so that the bore deformation at the time of actual working of the engine including the heat deformation cannot be embodied.

In this regard, it is believed that, when the dummy head is assembled into the cylinder block by the bolt fastening, the deformation similar to the heat deformation referring to the bore deformation can be generated, by strengthening the tightening force by the bolt, so as to liberate the bore load greater than or equal to that normally caused by the assembly of the actual cylinder head. Briefly, it is believed that, as the heat deformation out of the bore deformation has a larger scale of deformation than the assembly deformation at the time of assembling the actual cylinder head, the bore deformation by the assembly of the dummy head can come close to that at the time of actual working of the engine including the heat deformation, by strengthening the tightening force by the bolt so as to increase the bore load.

However, both of the dummy heads disclosed in the above two patent publications, by themselves, are set up to actively cause the elastic deformation. Accordingly, it is difficult t for the bolt axial force by the bolt fastening during the assembly of the dummy head to efficiently act as the bore load. The female screw portion (the bolt hole) of the cylinder block at the bolt tightening portion could be damaged by unnecessarily strengthening the tightening force by the bolt.

Consequently, it is an object of the invention to provide a jig for processing a cylinder block and a method for processing the same, which can efficiently liberate the bolt axial force by the bolt fastening during the assembly of the dummy head as a bore load, which can embody the bore deformation at the time of actual working of the engine including the heat deformation by assembling the dummy head, and which can try to improve the roundness of the cylinder bore at the time of actual working of the engine.

SUMMARY OF THE INVENTION

The problems so as to be solved by the present invention are as mentioned above. Next, the means of solving the problem will be described.

A jig for processing a cylinder block of the first aspect of the present invention, which has a dummy head body deforming a cylinder bore by assembling the dummy head body into a cylinder head mounting surface of the cylinder block by bolt fastening, during a finish processing for the cylinder bore in the cylinder block. The jig comprises a boss, having a contact surface contacting the peripheral portion of the cylinder bore in the cylinder head mounting surface on a mounting surface of the dummy head body for the cylinder block, wherein at least the dummy head body has the higher rigidity than the cylinder block.

Due to the above construction, a bolt axial force by bolt fastening during the assembly of the jig into the cylinder block can be efficiently acted as a bore load. Accordingly, the bore deformation including the heat deformation at the time of actual working of the engine can be embodied, by assembling the jig for processing into the cylinder block.

In the jig for processing the cylinder block according to the present invention, the boss contacts the whole surface of the peripheral portion of the cylinder bore via the contact surface.

Due to the above construction, a local high surface-pressure portion on the bore peripheral portion can be prevented from causing, by the increase of the bore load acting on the peripheral portion of the cylinder bore (the bore peripheral portion), so as to embody the bore deformation at the time of actual working of the engine by assembling the jig for processing into the cylinder block. Accordingly, an impression can be prevented from being left on the bore peripheral portion.

In the jig for processing the cylinder block according to the present invention, the boss is a radially constricted part of the cylinder bore constricted with respect to the contact surface, and has a constricted portion where the rigidity of the boss is adjusted by adjusting the dimension of the constricted part.

Due to the above construction, the bore load acting on the bore peripheral portion by assembling into the cylinder block can have a distribution, thereby becoming capable of controlling the bore load, not eventually, but purposely. Accordingly, the bore deformation caused by assembling into the cylinder block can faithfully correspond to the bore deformation including the heat deformation at the time of actual working of the engine.

In the jig for processing the cylinder block according to the present invention, the boss is constituted as a different member from the dummy head body.

Due to the above construction, the boss can be made up of the material having a different rigidity from the dummy head body, thereby adjusting the rigidity of the boss in terms of the material.

Even if the roughness (the asperity) of the surface due to the friction or the like, causing to the impression on the bore peripheral portion, is generated on the contact surface of the boss, by repeating the assembly into and removal from the cylinder block during the processing for a great number of cylinder blocks, the boss portion can be replaced.

In a method for processing a cylinder block according to the second aspect of the present invention, the method for processing the cylinder block includes the step of performing a finish processing of a cylinder bore of the cylinder block, with the cylinder bore deformed by assembling the dummy head body into a cylinder head mounting surface of the cylinder block by bolt fastening. In this aspect, the dummy head body has a higher rigidity than the cylinder block, and a boss member having a contact surface contacting a peripheral portion of the cylinder bore on the cylinder head mounting surface is interposed between the cylinder head mounting surface and the mounting surface for the cylinder block of the dummy head body.

Due to the above method, the bolt axial force by bolt fastening during the assembly of the dummy head body can be efficiently acted as a bore load. Accordingly, the bore deformation including the heat deformation at the time of actual working of the engine can be embodied, by assembling the dummy head body.

In the method for processing the cylinder block according to the present invention, the boss member contacts the whole surface of the peripheral portion of the cylinder bore via the contact surface.

Due to the above method, a local high surface pressure portion on the bore peripheral portion can be prevented from causing, by the increase of the bore load acting on the peripheral portion of the cylinder bore (the bore peripheral portion), so as to embody the bore deformation at the time of actual working of the engine by assembling the dummy head body. Accordingly, an impression can be prevented from being left on the bore peripheral portion.

In a method for processing a cylinder block according to the present invention, the boss member has a constricted portion as a radially constricted part of the cylinder bore constricted with respect to the contact surface and the rigidity of the boss member is adjusted by adjusting the dimension of the constricted portion.

Due to the above method, the bore load acting on the bore peripheral portion by assembling the dummy head body into the cylinder block can have a distribution, thereby controlling the bore load, not eventually, but purposely. Accordingly, the bore deformation caused by assembling the dummy head body can faithfully correspond to the bore deformation including the heat deformation at the time of actual working of the engine.

In a method for processing a cylinder block according to the present invention, the boss member is constructed integrally with the dummy head body.

The above method improves the workability, thereby being preferable in terms of the cost and the workability for the automation of the working process.

DETAILED DESCRIPTION OF THE INVENTION

Figure 1:
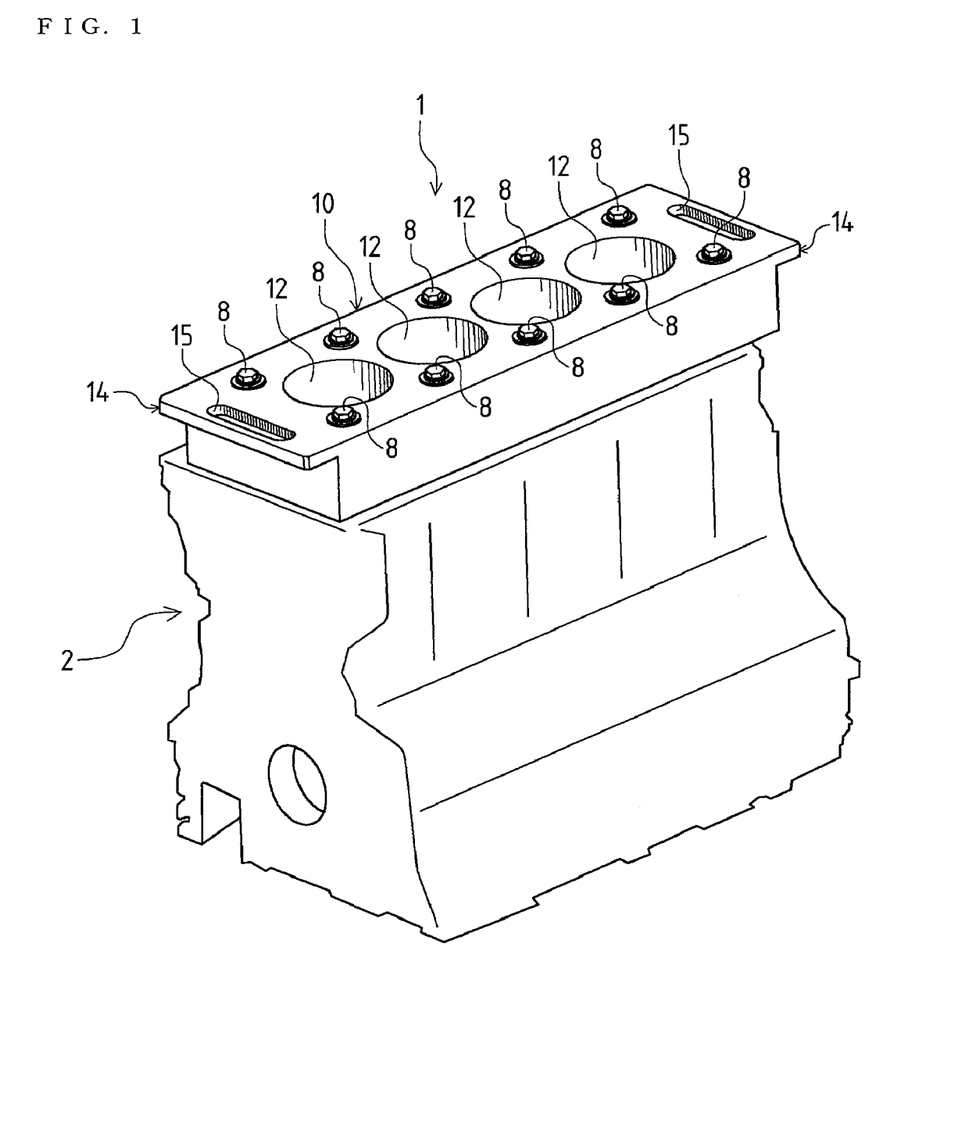
FIG. 1 is a perspective view showing the state of assembling of a dummy head into a cylinder block according to an embodiment of the present invention.
Figure 2:
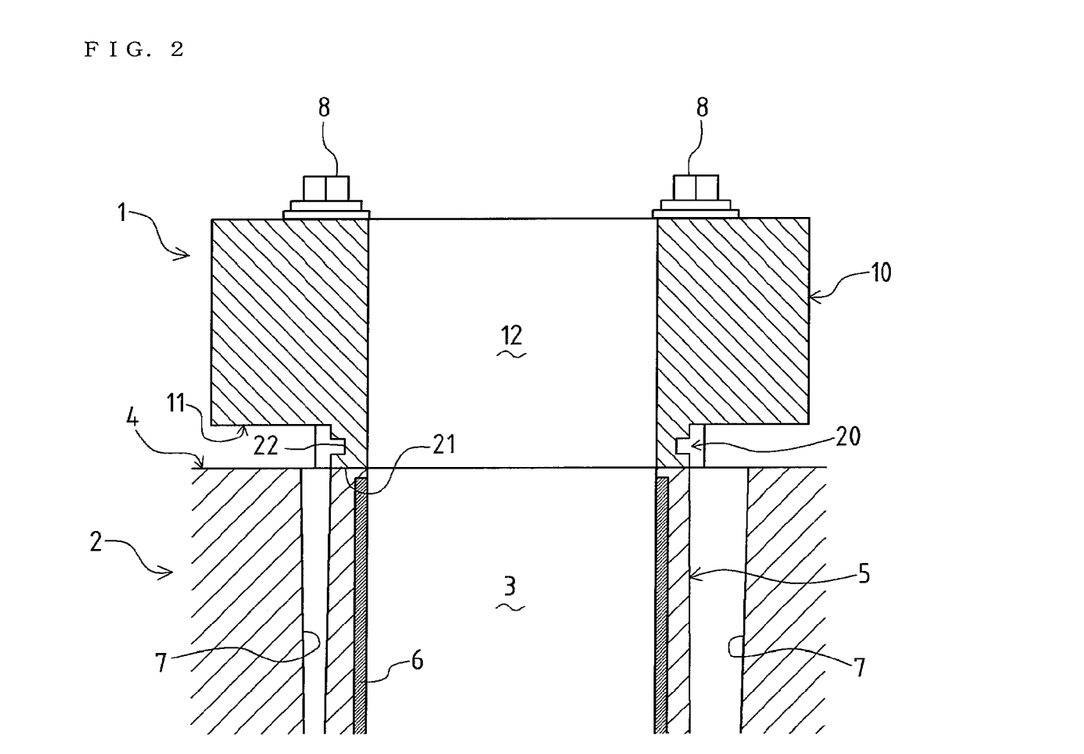
FIG. 2 is a cross-sectional view showing a joining portion of the dummy head and the cylinder block according to an embodiment of the present invention.
Figure 3:
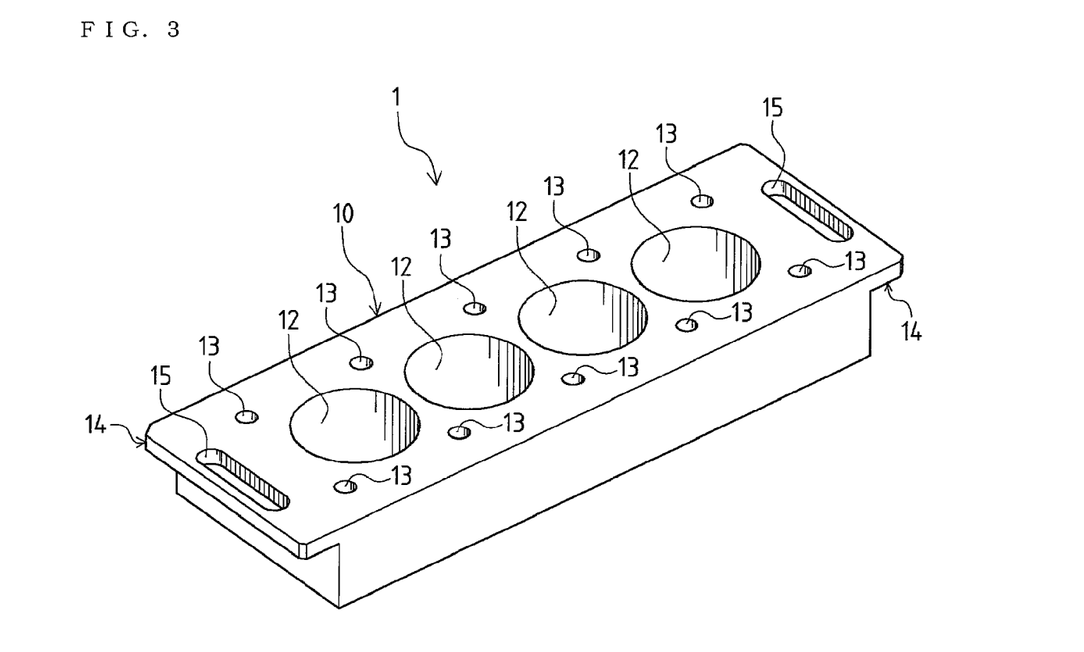
FIG. 3 is a perspective view showing the dummy head according to an embodiment of the present invention.
Figure 4:
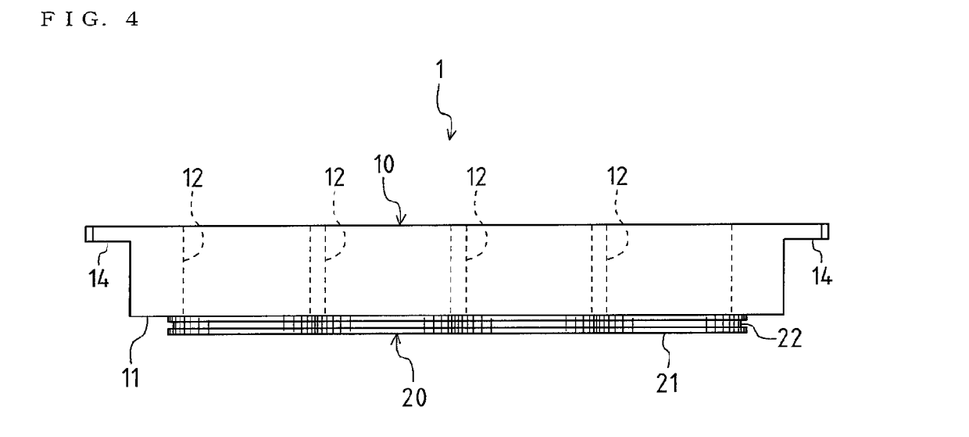
FIG. 4 is a side view in a longitudinal direction, showing the dummy head according to an embodiment of the present invention.
Figure 5:
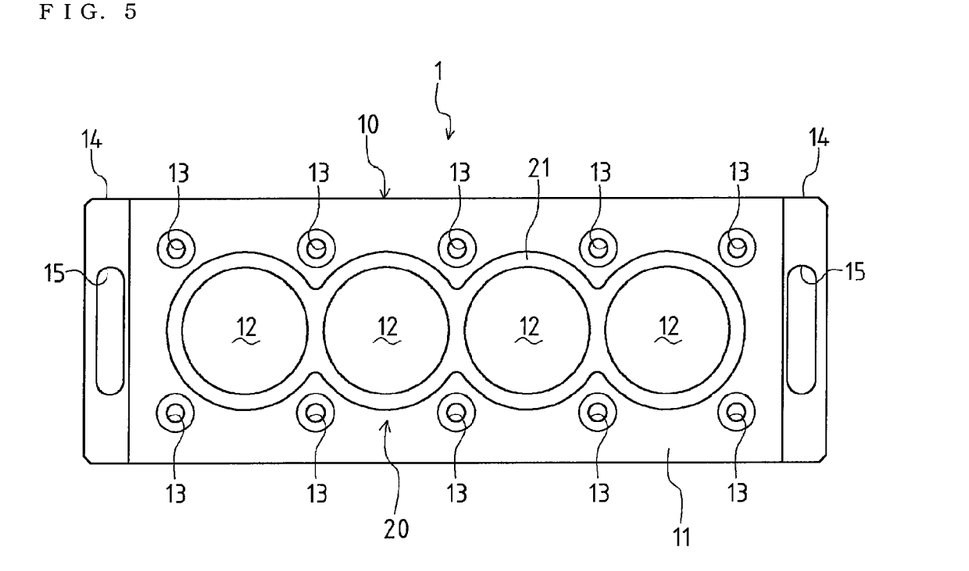
FIG. 5 is a bottom view of the dummy head according to an embodiment of the present invention.
Figure 6:
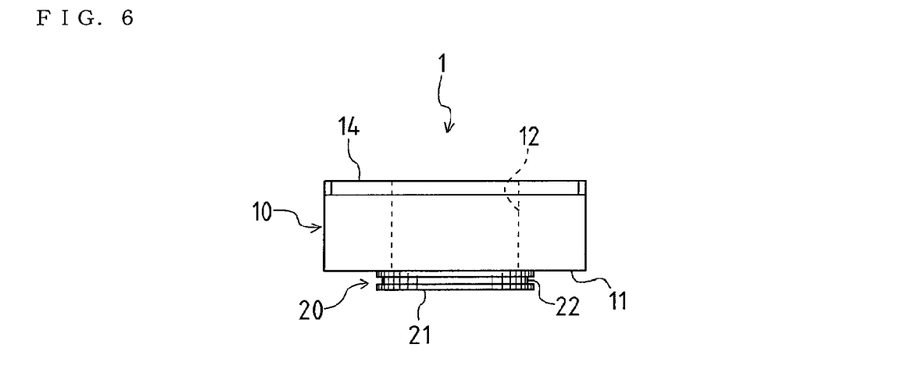
FIG. 6 is a side view in a lateral direction, showing the dummy head according to an embodiment of the present invention.

As shown in FIGS. 1 and 2, a method for processing a cylinder block according to the present invention comprises the step of bolting a dummy head 1 as a jig for processing the cylinder block equipped with a dummy head body 10 onto a cylinder head mounting surface (hereinafter, referred to as "a head mounting surface") 4 of a cylinder block 2, so as to deform a cylinder bore 3 provided with the cylinder block 2 and perform the finish processing of the cylinder bore 3.

The dummy head body 10 has a higher rigidity than the cylinder block 2, and a boss member (projection), having a contact surface 21 contacting the peripheral portion of the cylinder bore 3 in the head mounting surfaces 4, is interposed between the head mounting surface 4 and a mounting surface 11 to the cylinder block 2 of the dummy head body 10.

A construction (structure) of the dummy head 1 according to the present embodiment will be described, including that of the cylinder block 2.

As shown in FIGS. 1 and 2, the dummy head 1 as the jig for processing the cylinder block according to the present invention includes the dummy head body 10, which is assembled with the head mounting surface 4 of the cylinder block 2 by bolt fastening so as to deform the cylinder bore 3, in the finish processing for the cylinder bore 3 provided with the cylinder block 2.

Incidentally, the cross-sectional view shown in FIG. 2 is a view at a position close to the diameter of the cylinder bore 3 in the lateral direction of the cylinder block 2, showing the joining portion of the dummy head 1 and the cylinder block 2. Hereinafter, in the dummy head 1, the assembled side with the cylinder block 2 is defined as "the lower side", and the opposite side thereof is defined as "the upper side."

The cylinder block 2 according to the present embodiment makes up an in-line four-cylinder engine installed in automobiles or the like. The cylinder block 2 includes four cylinder bores 3 in-line. The cylinder bores 3 slidably incorporate pistons. The cylinder bores 3 are openings on the cylinder head mounting surface 4 into which the cylinder head in the cylinder block 2 is assembled.

As shown in FIG. 2, the cylinder bores 3 are formed so that cylindrical cylinder liners 6 are incorporated into inner peripheral surface of the cylinder portions 5, which are substantially cylindrically formed in accordance with the respective cylinder bores 3 in the cylinder block 2, by casting, press fitting or the like. In other words, the inner peripheral surfaces of the cylinder liners 6 form the cylinder bores 3 and become sliding surfaces of the pistons. Incidentally, in the present embodiment, the cylinder bores 3 are formed using the cylinder liners 6, but they may be directly formed using the structures of the cylinder block 2.

A water jacket 7 is formed on the periphery of the cylinder bores 3 (on the outer periphery sides of the cylinder portions 5) in the cylinder block 2. The water jacket 7 is open on the side of the head mounting surface 4. In other words, the cylinder block 2 of the present embodiment has open deck-typed structure where the water jacket 7 is open on the side of the head mounting surfaces 4.

As shown in FIGS. 3 to 6, also, the dummy head body 10 making up the dummy head 1 is totally formed as a substantially rectangular plate, the plane surface (the lower surface) of one side of which is defined as the mounting surface 11 facing with the cylinder block 2.

The dummy head body 10 has aperture portions 12 in the corresponding positions to the respective cylinder bores 3, with the dummy heads 1 assembled into the cylinder blocks 2. The aperture portion 12 functions as a through-hole allowing the finish processing for the cylinder bore 3. In other words, the cylinder bores 3 are communicated with the aperture portions 12, with the dummy head 1 assembled into the cylinder block 2, so as to perform the finish processing for the cylinder bores 3 via the aperture portions 12.

In the present embodiment, as described above, the cylinder block 2 has four cylinder bores 3 in line. Accordingly, the dummy head body 10 has four aperture portions 12 in the corresponding positions to those cylinder bores 3.

The dummy head 1 is incorporated into the cylinder block 2 by the bolt fastening using head bolts 8 as bolt members (fastening means). The head bolts 8 penetrate into the dummy head body 10 through bolt through-holes 13 and are threaded into bolt holes (not shown) as female screw portions provided with the head mounting surface 4 of the cylinder block 2. The bolt through-holes 13 are formed in the substantially perpendicular direction to the mounting surfaces 11 of the dummy head body 10.

The bolt through holes 13 are provided in the corresponding position to the bolt holes provided with the head mounting surface 4 on the cylinder clock 2, in the dummy head body 10. In the present embodiment, four bolt holes, which are provided with the head mounting surface 4 on the cylinder block 2, are provided at substantially regular intervals on the surroundings of the respective cylinder bores 3, and a total of ten bolt holes are provided, with two bolt holes out of them shared between the adjacent cylinder bores 3. The bolt through-holes 13 of the dummy head 1 are provided, so as to correspond to these bolt holes (see FIG. 3 or the like).

The dummy head body 10 are provided on both end portions of the longitudinal direction (the inline direction of the aperture portions 12) thereof with handle portions 14, which are used in delivery or the like during the assembly of the dummy head 1 into the cylinder block 2. The handle portions 14 are projected in the longitudinal direction from both sides of the upper surface of the dummy head body 10 (the opposite surface of the mounting surface 11). The handle portions 14 have long hole-shaped aperture portions 15 in the lateral direction of the dummy head body 10.

The dummy head 1 with the above construction of dummy head body 10 is incorporated into the cylinder block 2 with the head bolts 8, in the finish processing for the cylinder bores 3 in the cylinder block 2. Accordingly, the cylinder bores 3 in the cylinder block 2 are in the deformed state.

As shown in FIGS. 2, 4 to 6, the dummy head 1 is provided, on the side of the mounting surface 11 with respect to the cylinder block 2 of the dummy head body 10, with bosses 20 having a contact surface 21 contacting the peripheral portion of the cylinder bore 3 on the head mounting surface 4.

More specifically, in the present embodiment, as described above, the boss members, which are interposed between the head mounting surface 4 and the mounting surface 11 of the dummy head body 10, are integrally constructed with the dummy head body 10, as the bosses 20 provided with the dummy head body 10.

The bosses 20 are formed on the side of the mounting surface 11 of the dummy head body 10 so that the peripheral portions of the respective aperture portions 12 are substantially cylindrically projected and so that the corresponding portions to the adjacent aperture portions 12 out of the substantially cylindrical portions are continuously formed.

The lower surfaces of the bosses 20 (the mounting side surface to the cylinder block 2) define the contact surfaces 21 contacting the peripheral portions of the cylinder bores 3 (hereinafter, referred to as "the bore peripheral portions") on the head mounting surface 4.

The contact surfaces 21 of the bosses 20 contact the bore peripheral portions as mentioned before. In other words, the shape and size (area) of the contact surfaces 21 are formed in accordance with the bore peripheral portions.

In this regard, with reference to the bore peripheral portions of the cylinder block 2, the scopes (the contacting areas with the contact surfaces 21) and the shapes (the shapes of the contact portions with the contact surfaces 21) thereof or the like are not particularly limited. In the present embodiment, the bore peripheral portions are portions broadened up to the substantially constant distance radially outwardly from open ends of the cylinder bores 3 on the head mounting surface 4, and are continued between the adjacent cylinder bores 3. Thus, the contact surfaces 21 contacting the bore peripheral portions have the shapes where four annular portions are continuous (continued) in line (see FIG. 5). In the present embodiment, the bore peripheral portions define the upper surface (the surface on the side of the head mounting surface 4) portions of the cylinder portions 5 forming the cylinder bores 3.

Incidentally, in the present embodiment, the bosses 20 and the contact surfaces 21 thereof are constructed so that they are continued between the corresponding portions to the adjacent cylinder bores 3 in the four cylinder bores 3 tandemly-arranged, but the corresponding portions may be discontinuously constructed. In other words, the bosses 20 and the contact surfaces 21 thereof may be independently (cylindrically) provided in the respective cylinder bores 3 (corresponding to the respective aperture portions 12 of the dummy head body 10), depending on the placement intervals of the cylinder bores 3 in the cylinder block 2.

In the dummy head 1 according to the present embodiment, at least dummy head body 10 is set up to have higher rigidity than the cylinder block 2. In other words, in the dummy head 1, at least dummy head body 10 is constructed as the structure having higher rigidity than the cylinder block 2.

When the dummy head body 10 has higher rigidity than the cylinder block 2, the dummy head body 10 is made up of the material having higher rigidity than the cylinder block 2. The material having higher elastic modulus such as Young's modulus and rigidity modulus than the material making up the cylinder block 2 is used, as the material having higher rigidity than the cylinder block 2. For example, while the material making up the cylinder block 2 is aluminum alloy, the iron including iron alloy such as cast iron is used as the material making up the dummy head body 10. In other words, in this case, the dummy head body 10 is made from the iron, while the cylinder block 2 is made from the aluminum. The rigidity of the dummy head body 10 can be enhanced, for example, by thickening the dummy head body 10, in view of the stereoscopical configuration (the structure).

Briefly, at least dummy head body 10 in the dummy head 1 has higher rigidity than the cylinder block 2, by enhancing the rigidity of the dummy head body 10, considering the material used and the structure thereof.

As seen from the above, in the dummy head 1, the bosses 20 having the contact surfaces 21 contacting the bore peripheral portion of the cylinder block 2 are provided, and the dummy head body 10 has higher rigidity than the cylinder block 2. Due to the above construction, the bolt axial force by bolt fastening during the assembly of the dummy head 1 into the cylinder block 2 can be efficiently acted as the bore load. Accordingly, the bore deformation including the heat deformation at the time of actual working of the engine can be embodied, by assembling the dummy head 1 into the cylinder block 2.

More specifically, the heat deformation included in the bore deformation at the time of actual working of the engine has a larger scale of deformation than the assembly deformation caused at the time of assembling the cylinder head, which is a deformation generated by the heat load at the time of actual working of the engine. It is necessary that total loads (total amount of the bolt axial force) limited by assembling the dummy head 1 into the cylinder block 2 with the head bolt 8 is acted as the loads (the bore loads) so as to deform the cylinder bores 3 as efficiently as possible, in order to embody the heat deformation included in the bore deformation at the time of actual working of the engine during the finish processing of the cylinder bores 3.

Therefore, the rigidity of the dummy head body 10 is more heightened than that of the cylinder block 2, so as to minimize the deformation volume of the dummy head body 10 itself by the bolt fastening, thereby inhibiting the bolt axial force from being absorbed by the elastic deformation of the dummy head body 10. Moreover, the proportion of assessments of the bore loads (the proportion of the load on the bore peripheral portion to the total loads) can amount to 100%, by providing the dummy head 1 with the bosses 20, so as to contact the contact surfaces 21 of the bosses 20 with only the bore peripheral portion of the cylinder block 2, during the assembly of the dummy head 1 into the cylinder block 2.

More specifically, the bolt axial force by the head bolt 8 can be efficiently transmitted to the side of the cylinder block 2, by enhancing the rigidity of the dummy head body 10 so as to decreasing the deformation volume by the bolt fastening. Therefore, at least dummy head body 10 in the dummy head 1 is constructed so that it has sufficiently higher rigidity than the cylinder block 2, so as to efficiently transmit the bolt axial force by the head bolt 8 as described above. All of the total loads on the cylinder block 2 due to the assembly of the dummy head 1 can be used as the bore loads, by limiting the surface on the side of the cylinder block 2 contacting the contact surfaces 21 of the bosses 20 in the dummy head 1 to the bore peripheral portion.

The improvement of the bore loads by using the dummy head 1 having the above construction is as follows.

When the bolt axial force by the head bolt 8 during the assembly of the dummy head 1 into the cylinder block 2 is equivalent to that during the assembly of the actual cylinder head and gasket into the cylinder block 2 (during the assembly of the actual head), the bore load acting on the cylinder block 2 becomes multiplying of "inverse number value of the scale of assessments of the bore loads during the assembly of the actual head".

In other words, by using the dummy head 1 according to the present invention, the bore loads acting on the cylinder block 2 by assembling the dummy head 1 can be multiplied the "inverse number value of the scale of assessments of the bore loads during the assembly of the actual head", without enlarging the bolt axial force during the assembly of the dummy head 1 rather than that for assembling the actual cylinder head and gasket.

Therefore, in the finish processing for the cylinder bores 3 of the cylinder block 2, the bore deformation including the heat deformation at the time of actual working of the engine can be embodied, by assembling the dummy head 1 by normal bolt axial force. For this reason, the roundness of the cylinder bores 3 at the time of actual working of the engine can be improved, without accompanying the possibility of the damage in the blot holes (the female screw portion) of the cylinder block 2.

Accordingly, the frictions accompanying the sliding of the pistons in the cylinder bores 3 can be reduced, thereby expecting the improvement of fuel consumption of the engine equipped with the cylinder block 2 or the like.

More specifically, the pistons are provided with piston rings that contact and slide in the cylinder bores 3. Consequently, when the strains from perfect circles, in the bore deformation, are increased, sealing capacities by the piston rings at portions that deform from the perfect circles to the large diameters (diameter expanding portions) portion are decreased, thereby leading to the increase of oil consumption or blow-by gas by leaching. This situation can be prevented by increasing the tensions (the spreading forces) of the piston rings (by the tensile enhancements) and by securing minimum of pressing forces by the piston rings even at the portions changing into the large diameters in the cylinder bores. However, the tensile enhancements of the piston rings lead to the increase in the whole frictions of the cylinder bores 3. Consequently, as discussed previously, the roundness of the cylinder bores 3 can be improved, thereby reducing the frictions accompanying the sliding of the pistons in the cylinder bores 3.

Partial contacts or the whole contacts are considered as the contacts of the contact surfaces 21 of the bosses 20 provided with the dummy head 1 with the bore peripheral portion.

When the contacts of the contact surfaces 21 with the bore peripheral portion are partial ones, the bore loads can be locally acted only on the desired regions of the bore peripheral portion, thereby corresponding to the more complicated deformations, such as the bore deformation including the heat deformation at the time of actual working of the engine.

On the other hand, with increase in the bore loads on the bore peripheral portion by assembling the dummy head 1, as described above, the impression remained by assembling the dummy head 1 into the bore peripheral portion is considered as a matter of concern. The impression remained on the bore peripheral portion lead to the reduction of sealing capacity during the assembly of the actual cylinder head and gasket into the cylinder block 2.

It is conceivable that the impression remained on the bore peripheral portion can be dealt with by processing the surface of the bore peripheral portion after the finish processing for the cylinder bores 3, which leads to the increase of the working process.

In this case, it is preferable that the bosses 20 thoroughly contact the bore peripheral portion via the contact surfaces 21, in the dummy head 1.

More specifically, for example, when the bore peripheral portion (the upper surface portions of the cylinder portions 5) is formed on the same plane in the cylinder block 2, the contact surface 21 of the boss 20 is formed on the same plane accordingly. The contact surface 21 of the boss 20 is constituted so that it contacts not partially but thoroughly the bore peripheral portion, with the dummy head 1 assembled into the cylinder block 2.

In this way, the local high surface pressure portion on the bore peripheral portion is prevented from causing, by thoroughly contacting the boss 20 with the peripheral portion of the cylinder bore 3 via the contact surface 21, even when the bore loads acting on the bore peripheral portion are increased, so as to embody the bore deformation at the time of actual working of the engine by the assembly of the dummy head 1 into the cylinder block 2. Accordingly, the impression can be prevented from remaining on the bore peripheral portion.

As shown in FIGS. 2, 4 6 and 7, the bosses 20 of the dummy head 1 have constricted portions 22, which are constricted parts in the radial direction of the cylinder bore 3 toward the contact surface 21, and at which the rigidities of the bosses 20 are adjusted by adjusting the dimensions of the constricted parts thereof.

In the bosses 20 as portions where the peripheral portions of the respective aperture portions 12 on the mounting surface 11 of the dummy head body 10 are projected substantially cylindrically, the constricted portions 22 are formed as constricted parts toward the contact surface 21, in the radial direction of the cylinder bores 3, i.e., in the radial direction of the aperture portions 12 on the state where the dummy head 1 is incorporated into the cylinder block 2 (hereinafter, referred to as "the radial direction"). In other words, the constricted portions 22 are formed as the diameter-shrunk portions in the bosses 20 substantially cylindrically projecting between the mounting surface 11 of the dummy head body 10 and the contact surfaces 21 of the bosses 20, as previously described.

Incidentally, as shown in Figs., in the present embodiment, the constricted shapes of the constricted portions 22 are rectilinear ones to the projecting direction of the bosses 20 (gradually inclined ones to another portions of the bosses 20). In this regard, the constricted shapes of the constricted portions 22 may be formed so that the constricted portions 22 are smoothly tapered toward another portions of the bosses 20 (so that the thickness thereof are gradually reduced) and so on.

In the present embodiment, the constricted portions 22 are provided at the substantially central portions of the projecting direction (the vertical direction) of the bosses 20, and has shapes of laterally-facing recessed portions by providing the bosses 20 with the outer peripheral slots, on cross section of the bosses 20 in FIG. 2 or the like. In this regard, the constricted portions 22 may be directly provided with the mounting surface 11 of the dummy head body 10, so that the bosses 20 may be L-shape on the same cross section as described above.

Moreover, in the present embodiment, the constricted portions 22 are provided so that the internal surfaces thereof form the same surface as the wall surfaces forming the aperture portions 12 of the dummy head body 10, along with the inner peripheral surfaces of the bosses 20. In this regard, the constricted portions 22 may be provided at the intermediate portions of the radial direction in the bosses 20, so that the bosses 20 may be lateral-H-shape or reverse-T-shape on the same cross section as described above.

Briefly, the constricted parts to the radial direction of the cylinder bores 3 in the constricted portions 22 may be set up to be not only tapered from the outer peripheral sides of the bosses 20, but also tapered from the inner peripheral sides thereof, for example, by forming the inner peripheral slots and so on.

In this way, in the dummy head 1, the bosses 20 are provided on the contact surfaces 21 thereof with the constricted portions 22 as the constricted parts to the radial direction of the cylinder bores 3.

In the bosses 20 having the constricted portions 22, the dimensions of the constricted portions 22 are adjusted, so as to adjust the rigidities of the bosses 20.

In other words, the constricted portions 22 have lower rigidities than another portions of the bosses 20 due to the thin-wall shapes thereof. As a result, the rigidities of the whole bosses 20 are adjusted by adjusting the dimensions of the constricted portions 22.

Figure 7:
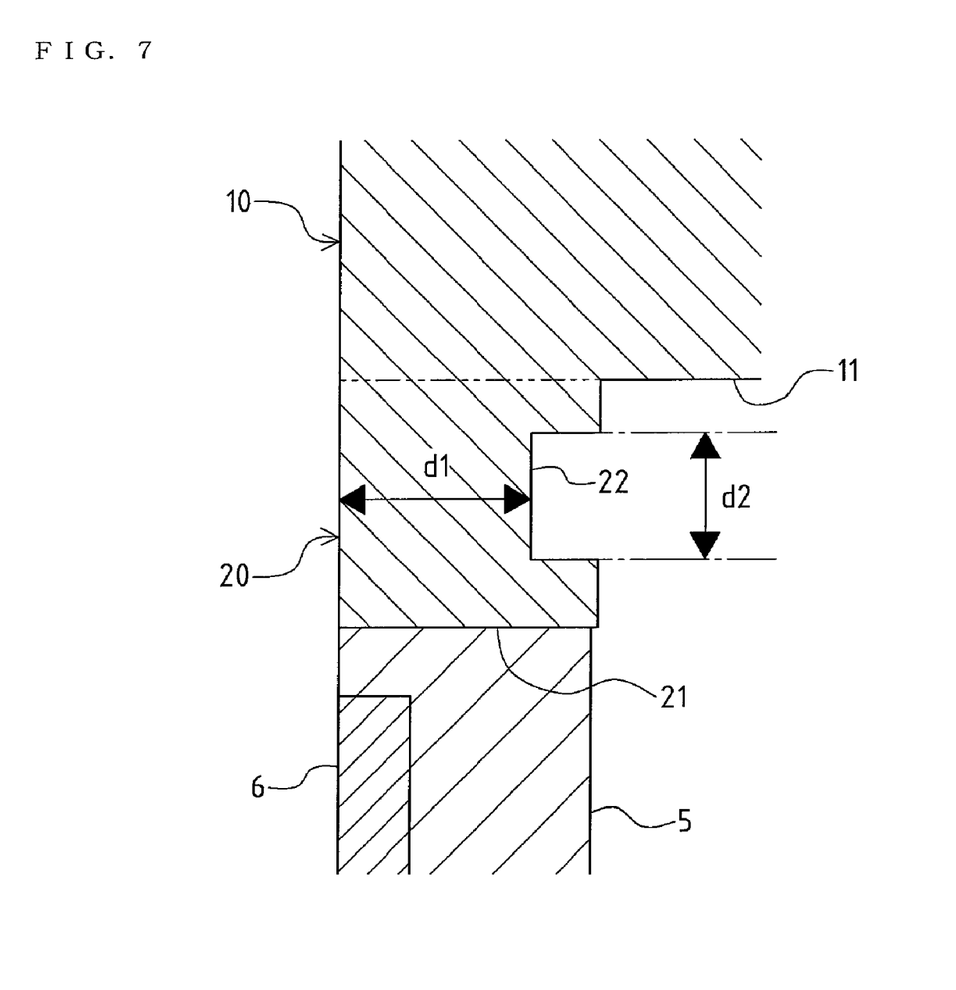
FIG. 7 is a partial enlarged sectional view showing the joining portion of the dummy head and the cylinder block according to an embodiment of the present invention.

In particular, as shown in FIG. 7, the dimensions to be adjusted in the constricted portions 22 include the radial thickness dimension d1 as the dimension about the thickness in the radial direction of the constricted portions 22, and the length dimension d2 as the dimension about the length in the projecting direction of the bosses 20 in the constricted portions 22. The dimensions including the radial thickness dimension d1 and the length dimension d2 in the constricted portions 22 are adjusted, so that the rigidities of the bosses 20 are adjusted via the constricted portions 22.

Incidentally, FIG. 7 is a cross-sectional diagram in the same direction and position as one shown in FIG. 2, showing an enlarged view of one side of the radial direction in the joint portion of the dummy head 1 and the cylinder block 2.

The dimensions including the radial thickness dimension d1 and the length dimension d2 of the constricted portions 22 are changed in accordance with the regions of the bosses 20 (the contact regions of the contact surface 21 with the bore peripheral portion), so that the rigidities of the bosses 20 are partially adjusted. In other words, the bosses 20 is set up to have partially different rigidities, by setting up to have different dimensions corresponding to the regions of the constricted portions 22 thereof.

In this way, the bosses 20 are provided with the constricted portions 22, and the dimensions of the constricted portions 22 are adjusted so as to adjust the rigidities of the bosses 20, so that the bore loads, acting on the bore peripheral portion by assembling the dummy head 1 into the cylinder block 2, can have distributions, thereby controlling the bore loads, not eventually, but purposely.

Accordingly, the bore deformation caused by assembling the dummy head 1 into the cylinder block 2 can faithfully correspond to the bore deformation including the heat deformation at the time of actual working of the engine.

Briefly, the heat deformation, which is caused at the time of actual working of the engine in the bore deformation of the cylinder block 2, has a larger scale of deformation than the assembly deformation during the assembly of the actual head, and is caused by "the heat stress" unrelated to the load caused during the assembly of the actual head. Therefore, the bore deformation caused at the time of actual working of the engine is affected by the flowing position and flow rate of cooling water in the cylinder block 2, or the intervals between the cylinder bores 3 and the like, leading to be complicated.

For this reason, so as to faithfully embody the heat deformation out of the bore deformation by assembling the dummy head 1, the surface pressure in the contact portion of the dummy head 1 with the bore peripheral portion of the cylinder block 2, and the rigidity of the dummy head 1 in the sheared direction of the dummy head 1 (in the radial direction of the aperture portions 12) need to be changed corresponding to the portions, so as to control the bore loads (the loads acting on the bore peripheral portion), not eventually, but purposely.

However, since the conventional dummy heads do not have structural features in order to control the surface pressure corresponding to the portions and the rigidity in the sheared direction as described above, it was difficult to embody the bore deformation including the heat deformation at the time of actual working of the engine.

In this regard, as already stated, the bosses 20 are provided with the constricted portions 22, and the rigidity of the bosses 20 are changed and controlled according to the portions, thereby controlling the surface pressure in the bore peripheral portion or the like.

The following embodiment is considered, with regard to the change of the dimensions of the constricted portions 22 in the bosses 20 corresponding to the portions.

More specifically, for example, the dimensions of the constricted portions 22 are changed, so as to increase the bore loads acting on the bore peripheral portions corresponding to the central two cylinder bores 3, in the cylinder bores 3 at the middle portion, which have relatively large number of bore deformation volumes by the heat deformation due to the high heat loads at a relatively high temperature during the actual working of the engine, i.e., in the cylinder block 2 constituting the in-line four-cylinder engine of the present embodiment. In other words, at this time, the dimensions of the constricted portions 22 at the corresponding portions to each of the cylinder bores 3 in the cylinder block 2 are changed to be made different, thereby controlling the rigidities of the bosses 20.

The changes in the dimensions of the constricted portions 22 are considered, so as to change the bore loads acting on the bore peripheral portions of the respective cylinder bores 3 in the circumferential direction thereof. In other words, at this time, the dimensions of the constricted portions 22 at the corresponding portions to the respective cylinder bores 3 in the bosses 20 are changed to be made different in the circumferential direction thereof, thereby controlling the rigidities of the bosses 20.

Figure 8:
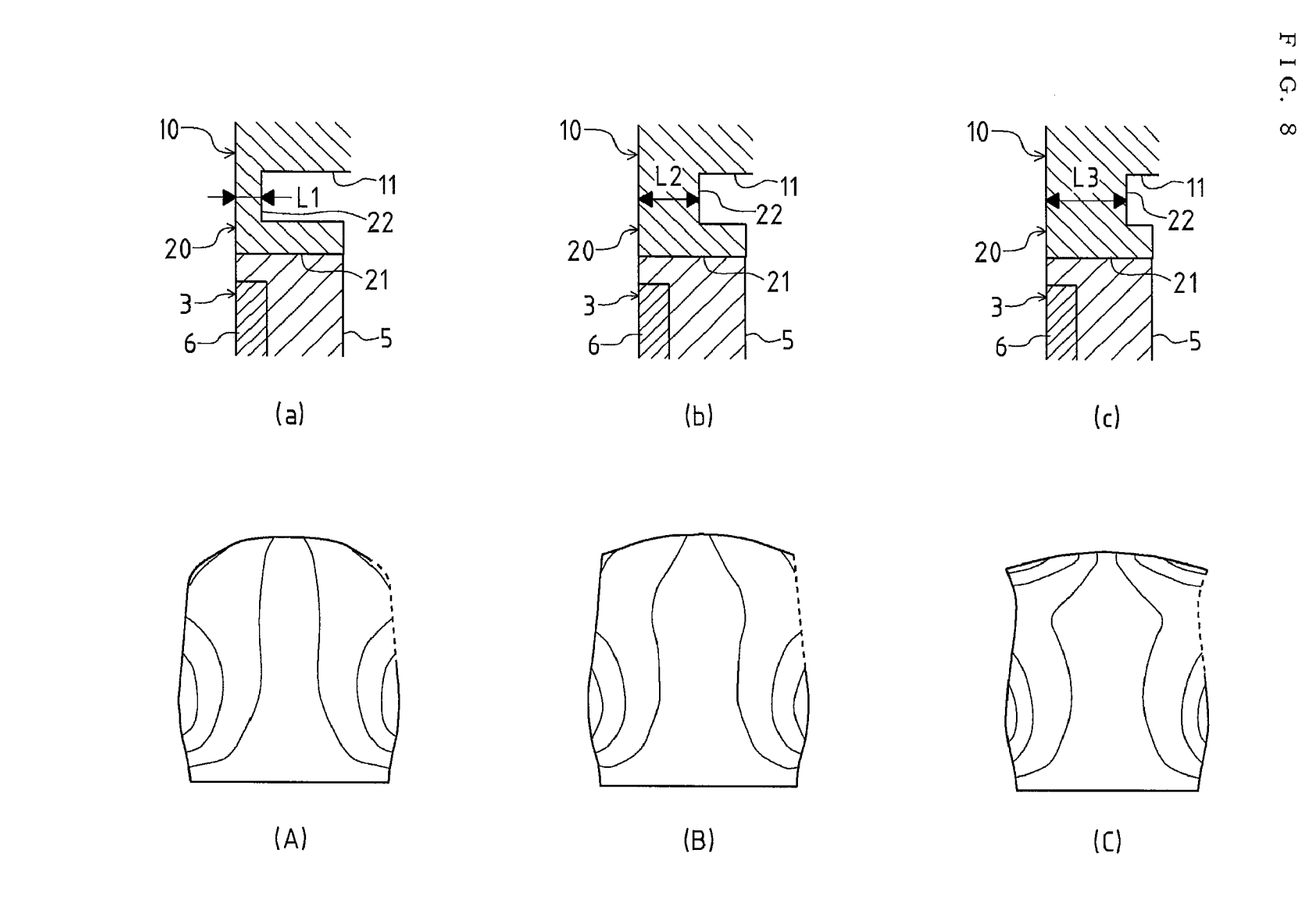
FIG. 8 is a diagram showing a simulation result of the change of a bore deformation by changing a dimension of a constricted portion.

The change of the bore deformation by changing the dimensions of the constricted portions 22 in the bosses 20 will be described, with reference to FIG. 8 showing the simulation result (the simplified model).

The present simulation shows the change of the bore deformation in a cylinder bore 3, when the dimensions of the constricted portions 22 at the corresponding portions to the respective cylinder bores 3 in the bosses 20 are identical in the circumferential direction, and when the dimensions of the radial thickness dimensions d1 (see FIG. 7) of the constricted portions 22 are changed.

In FIG. 8, the upper Figs., i.e., FIGS. 8 (a) to (c), are cross-sectional views of the corresponding portions to FIG. 7, showing the change in the radial thickness dimensions d1 of the constricted portions 22 of the present embodiment. FIGS. 8 (a) to (c) show the radial thickness dimensions d1 of the constricted portions 22 as the dimension value L1, L2 and L3 (L2<L2<L3), respectively.

More specifically, the dimension value L1 of the radial thickness dimension d1 in FIG. 8(a) is the value when the constricted portions 22 are relatively thin (the thickness value is about one fourth of other portions of the bosses 20). The dimension value L3 in FIG. 8 (c) is the value when the constricted portions 22 are relatively thick (the thickness value is about three fourths of other portions of the bosses 20). The dimension value L2 in FIG. 8 (b) is the value when the constricted portions 22 are in size between the dimension values L1 and L3 (the thickness value is about half of other portions of the bosses 20).

In FIG. 8, the lower Figs., i.e., FIGS. 8 (A) to (C) show the deformations of the inner surfaces of the cylinder bores 3 (the wall surface of the cylinder bores 3), when assembling the dummy head 1 corresponding to each of the same FIG. (a) to (c), in which they are one example using CAE calculation.

More specifically, FIG. 8 (A) shows the example of CAE calculation result of the bore deformation when the radial thickness dimensions d1 of the constricted portions 22 is the dimension value L1. FIG. 8 (B) shows the example of CAE calculation result of the bore deformation when the radial thickness dimensions d1 of the constricted portions 22 is the dimension value L2. FIG. 3 (C) shows the example of CAE calculation result of the bore deformation when the radial thickness dimensions d1 of the constricted portions 22 is the dimension value L3. Incidentally, the upper and lower directions in the respective FIGS. 8 (A) to (C) correspond to those of the cylinder bores 3. The bore deformations shown in FIGS. 8 (A) to (C) are exaggeratingly shown for convenience of explanation. The stripe patterns shown in FIGS. 8 (A) to (C) show the amount of displacement in the inner surfaces of the cylinder bores 3, which are increased from the central portion to the outside.

As shown in FIG. 8 (*a*), when the radial thickness dimensions d1 of the constricted portions 22 is the dimension value L1, the bore loads caused by assembling the dummy head 1 locally act in the inner portions of the bore peripheral portions of the cylinder block 2.

In this case, as shown in FIG. 8 (A), the cylinder bore 3 involves the narrowing deformation on the upper side thereof (the deformation where the upper portion of the cylinder portion 5 drops inward) (see the dotted line region, in FIG. 8 (A)). The lower side of the cylinder bore 3 involves the deformation swelling outward.

As shown in FIG. 8 (*b*), when the radial thickness dimensions d1 of the constricted portion 22 is the dimension value L2, the dimensions of the constricted portion 22 is more widened outward, compared to the case where that is the above-mentioned dimension value L1, so that the portion on which the bore load is acting, in the bore peripheral portion is widened outward.

In this case, as shown in FIG. 8 (B), the deformation on the upper side of the cylinder bore 3 is relatively gentle, compared to the case where the radial thickness dimensions d1 of the constricted portion 22 is the dimension value L1 (see the dotted line region, in FIG. 8 (B). In other words, at this time, the upper side of the cylinder bore 3 has a small degree of deformation, and the cylinder bore 3 involves the deformation where only the lower side thereof swells outward as is the case with the above-mentioned.

As shown in FIG. 8 (C), when the radial thickness dimensions d1 of the constricted portion 22 is the dimension value L3, the dimensions of the constricted portion 22 is more widened outward, than the case of the dimension value L2, compared to the case where that is the above-mentioned dimension value L1, so that the portion in which the bore load is acting, in the bore peripheral portion is more widened outward.

In this case, as shown in FIG. 8 (C), the cylinder bore 3 involves the swelling deformation on the upper side thereof (the deformation where the upper portion of the cylinder portion 5 drops outward) (see the dotted line region, in FIG. 8 (C)). The lower side of the cylinder bore 3 involves the deformation swelling outward, as is the case with the respective cases described above (see FIGS. 8 (A), (B)).

As can be seen from these simulation results, the bore deformation by assembling the dummy head 1 changes, as at least radial thickness dimensions d1 out of the dimensions of the constricted portion 22 in the bosses 20 changes. In other words, the rigidities of the bosses 20 can be controlled by changing the radial thickness dimensions d1 of the constricted portion 22, thereby controlling the bore loads or the like, not eventually, but purposely. Accordingly, the bore deformation by assembling the dummy head 1 can be controlled.

With regard to the change of the bore deformation by changing the dimensions of the constricted portion 22 described previously, especially, as the above-mentioned simulation results, the deformation on the upper side of the cylinder bore 3 is susceptible to the effect of changing the radial thickness dimensions d1 of the constricted portion 22. In particular, as the radial thickness dimensions d1 of the constricted portion 22 are widened from within outside, the deformation on the upper side of the cylinder bore 3 can be adjusted from the narrowing deformation to the swelling one.

Because the upper portion of the cylinder bore 3 is formed on the upper side thereof with the combustion chamber, it has the relatively high temperature, and is deformable at the time of actual working of the engine.

Therefore, the adjustment of the radial thickness dimensions d1 of the constricted portion 22 leads to correspond, effectively, the bore deformation by assembling the dummy head 1 to the bore deformation including the heat deformation at the time of actual working of the engine.

As observed above, in the dummy head 1 according to the present embodiment, the bosses 20, as projecting members, interposed between the head mounting surface 4 of the cylinder block 2 and the mounting surface 11 of the dummy head body 10, is formed integrally with the dummy head body 10.

Specifically, for example, in the dummy head 1, the bosses 20 are formed integrally with the dummy head body 10, with an integral molding by casting, a machining or the like.

Thus, the projecting members, which is interposed between the head mounting surface 4 of the cylinder block 2 and the mounting surface 11 of the dummy head body 10, are integrally formed as the bosses 20 for the dummy head body 10, thereby improving the workability so as to be preferable in terms of the cost and the workability for the automation of the working process, during the finish processing for the cylinder bore 3 using the dummy head 1.

In other words, for example, as is conventionally done, when the gasket is interposed between the dummy head and the head mounting surface of the cylinder block, the assembling of the dummy head into the head mounting surface includes the procedures of attaching the gasket to the head mounting surface and mounting the dummy head thereon.

Therefore, since the bosses 20 are formed integrally with the dummy head body 10 as described above, the dummy head 1 is formed as an integral structure including the bosses 20, thereby simplifying the operations such as the assembling of the dummy head 1 into the head mounting surface 4 so as to improve the workability.

Since the bosses 20 are formed integrally with the dummy head body 10, the conveyance of the dummy head 1 and the attachment of it to the head mounting surface 4 are eased, thereby being suitable for the automation of the working process of the cylinder block 2.

Meanwhile, the bosses 20 in the dummy head 1 may be formed as the different members from the dummy head body 10.

In this case, for example, two-dot chain lines in FIG. 7 are defined as the separation position, and the bosses 20 are formed as the different members from the dummy head body 10.

Incidentally, even when the bosses 20 are formed as the different members from the dummy head body 10, the bosses 20 as the different members are firmly fixed to the dummy head body 10 using the fastening means such as the bolts or the like, thereby realizing the integral construction of the bosses 20 with the dummy head body 10 as mentioned above.

As seen from the above, the bosses 20 are constituted as different members from the dummy head body 10, so that the bosses 20 can be made up of the materials having different rigidities from the dummy head body 10, thereby adjusting the rigidities of the bosses 20 in terms of the material.

The bosses 20 are constituted as a different member from the dummy head body 10, so that the portions of the bosses 20 can be replaced. Accordingly, even if the roughness (the asperity) of the surfaces due to the frictions or the like, causing to the impression on the bore peripheral portion, are generated on the contact surfaces 21 of the bosses 20, by repeating the assembly of the dummy head 1 into and the removal it from the cylinder blocks 2 during the processing for a great number of cylinder blocks 2 using the dummy head 1, the portions of the bosses 20 can be replaced so as to solve the problem of the asperity.

In this regard, even when the bosses 20 are formed integrally with the dummy head body 10 by casting or the like, the surfaces on the contact surfaces 21 of the bosses 20 are removed and so on, thereby handling the abrasion boundary (the boundary of the roughness).

More specifically, in the bosses 20, the portions affecting the rigidity, i.e., the portions directly affecting the bore deformation are the constricted portions 22. Thus, when the contact surface 21 reaches the abrasion boundary, the surface of the contact surface 21 is removed by processing the surface thereon, whereby the dummy head 1 can be used again, without affecting the bore deformation by the action of the bosses 20.

In the above-described embodiment, the cylinder block 2 as the object of the processing performed using the dummy head 1 is an open deck typed structure, but not be limited to it, and may be a so-called closed deck typed one. The present invention is applicable regardless of the material or the casting method (the aluminum die-casting or the like) for the cylinder block 2.

INDUSTRIAL APPLICABILITY

The jig for processing of the cylinder block and the processing method for it according to the present invention are industrially applicable, because they can efficiently act the bolt axial force by the bolt fastening during the assembly of the dummy head as the bore loads, and can embody the bore deformation including the heat deformation at the time of actual working of the engine by assembling the dummy head, thereby improving the roundness of the cylinder bore at the time of actual working of the engine.

The invention claimed is:

1. A jig for processing a cylinder block having a dummy head body deforming a cylinder bore by being assembled into a cylinder head mounting surface of the cylinder block by bolt fastening, the jig used during a finish processing for the cylinder bore in the cylinder block comprising:

a boss, having a contact surface contacting a peripheral portion of the cylinder bore in the cylinder head mounting surface on a mounting surface of the dummy head body for the cylinder block, and having a constricted portion which is a radially constricted part of the cylinder bore, constricted with respect to the contact surface, where a rigidity of the boss is adjusted by adjusting a dimension of the constricted part, wherein the dummy head body has a higher rigidity than the cylinder block.

2. The jig for processing the cylinder block as set forth in claim 1, wherein the boss contacts the whole surface of the peripheral portion of the cylinder bore via the contact surface.

3. The jig for processing the cylinder block as set forth in claim 1, wherein the boss is constituted as a different member from the dummy head body.

4. A method for processing a cylinder block, comprising:

performing a finish processing of a cylinder bore of the cylinder block, with the cylinder bore deformed by assembling a dummy head body into a cylinder head mounting surface of the cylinder block by bolt fastening, wherein the dummy head body has a higher rigidity than the cylinder block, wherein a boss member having a contact surface contacting a peripheral portion of the cylinder bore on the cylinder head mounting surface is interposed between the cylinder head mounting surface and the mounting surface of the dummy head body for the cylinder block; and wherein the boss member having a constricted portion as a radially constricted part of the cylinder bore, constricted with respect to the contact surface, where a rigidity of the boss member is adjusted by adjusting a dimension of the constricted portion.

5. The method for processing the cylinder block as set forth in claim 3, wherein the boss member contacts the whole surface of the peripheral portion of the cylinder bore via the contact surface.

6. The method for processing the cylinder block as set forth in claim 4, wherein the boss member is constructed integrally with the dummy head body.

* * * * *

UNITED STATES PATENT AND TRADEMARK OFFICE
CERTIFICATE OF CORRECTION

PATENT NO. : 8,033,534 B2
APPLICATION NO. : 12/443610
DATED : October 11, 2011
INVENTOR(S) : Tomoyuki Shinkai et al.

It is certified that error appears in the above-identified patent and that said Letters Patent is hereby corrected as shown below:

In the Title Page:  Replace the inventors information as follows:

Item --(75) Inventors:  Tomoyuki Shinkai, Nishikamo-gun (JP);

Takahiro Harada, Chiryu-shi (JP);

Kazuhiro Asayama, Nagoya-shi (JP);

Kazuki Watanabe, Toyota-shi (JP)--.

| Column | Line | |
|---|---|---|
| 16 | 34 | Change "in claim 3" to --in claim 4--. |

Signed and Sealed this
Third Day of July, 2012

David J. Kappos
*Director of the United States Patent and Trademark Office*